Figure 1:
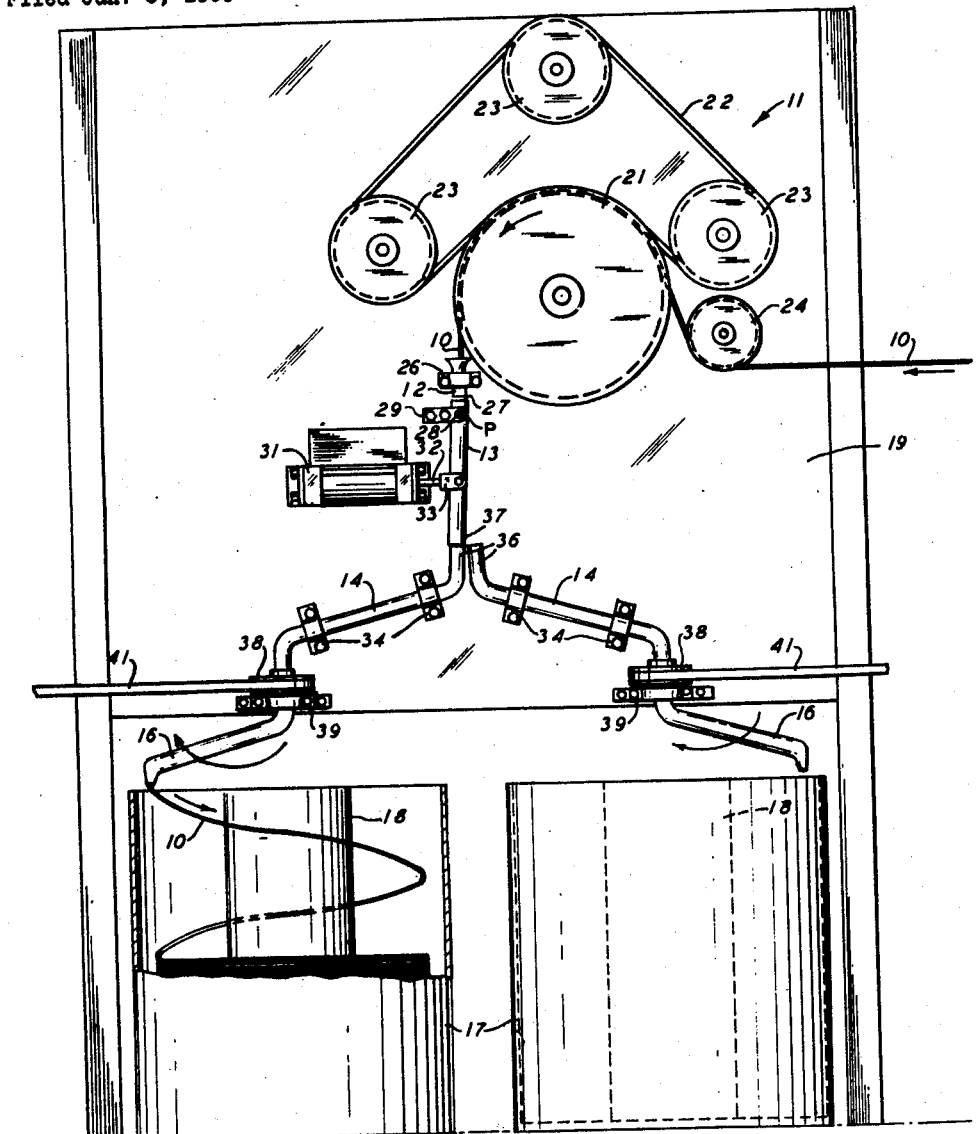

July 12, 1960 A. G. FOSTER 2,944,755
CUT-OVER MECHANISM FOR ADVANCING STRANDS
Filed Jan. 5, 1959 2 Sheets-Sheet 1

INVENTOR
A. G. FOSTER
BY
*H. J. Winegar*
ATTORNEY

July 12, 1960     A. G. FOSTER     2,944,755
CUT-OVER MECHANISM FOR ADVANCING STRANDS Filed Jan. 5, 1959     2 Sheets-Sheet 2

INVENTOR.
A. G. FOSTER
BY
*H. J. Winegar*
ATTORNEY

United States Patent Office 2,944,755
Patented July 12, 1960

2,944,755

CUT-OVER MECHANISM FOR ADVANCING STRANDS

Arthur G. Foster, Westfield, N.J., assignor to Western Electric Company, Incorporated, New York, N.Y., a corporation of New York Filed Jan. 5, 1959, Ser. No. 785,021

6 Claims. (Cl. 242—80)

The present invention relates generally to cut-over mechanisms for advancing strands, and more particularly to a cut-over mechanism for delivering an advancing strand alternately to a pair of take-up units therefor.

In the communications industry it is frequently desired to take up an advancing strand, such as a polyethylene-insulated copper wire issuing continuously from an extruder, with a pair of take-up units which are alternately employed to insure continuous collection of the wire. In one type of take-up unit, the wire is delivered through a stationary guide tube into a rotating nozzle which distributes the wire in coil form in a stationary container, such as an open-topped barrel made of fibrous material. In such an apparatus, it is important to provide a quick and effective mechanism for cutting over between a receiving barrel and a standby barrel when the receiving barrel becomes full. The cut-over apparatus must be able to change the line of distribution of the advancing wire from one of the guide tubes to the other while severing the wire in the process.

Accordingly, the principal object of the present invention is to provide new and improved cut-over mechanisms for advancing strands.

Another object of the invention is to provide a cut-over mechanism for delivering an advancing strand alternately to a pair of take-up units therefor.

A further object of the invention is to provide a cut-over mechanism designed for delivering an advancing strand alternately into a pair of guide tubes for distribution into an associated pair of take-up receivers, and for cutting the strand in the process.

A cut-over mechanism, illustrating certain features of the invention, may include a movable distributing guide, such as a tube, arranged to deliver an advancing strand alternately through a number of guide members, such as tubes. Means are provided for causing relative cut-over movement between the distributing tube and the guide tubes, together with means provided on the distributing tube and the guide tubes which co-operate to sever the advancing strand during the cut-over movement.

The distributing tube may be mounted near the entrance end thereof pivoting movement, and the exit end of this tube is curved along an arc of a circle having the pivot point as a center. The entrance ends of the guide tubes are mounted close to each other and in close proximity to the exit end of the distributing tube and are also curved according to an arc of a concentric circle having the pivot point of the distributing tube as a center. Portions of the closely adjacent ends of the distributing tube and the guide tubes co-operate to sever the advancing strand as the distributing tube is moved from one position to the other.

Figure 2:
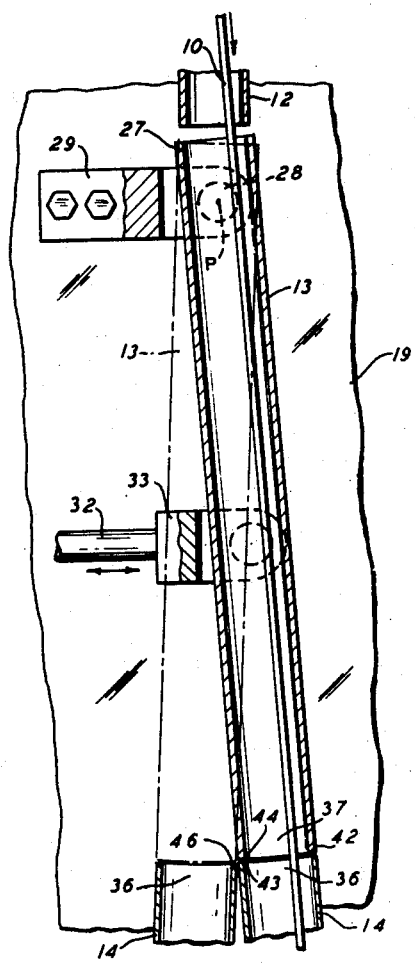

Other objects and advantages of the invention will appear from the following detailed description of a specific embodiment thereof, when read in conjunction with the appended drawings, in which:

Fig. 1 is a front elevation of strand collection apparatus including a cut-over mechanism according to the invention, showing a distributing tube in one operating position, and Fig. 2 is an enlarged, sectional view of a portion of the apparatus illustrated in Fig. 1, showing the distributing tube moved to an alternative operating position.

Referring now in detail to the drawings and in particular to Fig. 1, a strand, such as an insulated wire 10 issuing continuously from an extruder (not shown), is advanced from right to left by a belt-type capstan, designated generally by the numeral 11. The capstan 11 directs the wire 10 vertically downward through a short, stationary, bell-mounted collecting tube 12, thence through a pivotable distributing tube 13, thence through one or the other of a pair of guide tubes 14—14 to an associated one of a pair of rotatable nozzles 16—16. The wire 10 emerges from one of the nozzles 16—16 and is distributed in the form of a continuous coil within an associated one of a pair of stationary take-up barrels 17—17 having central cores 18—18 around which the wire coils are collected.

The capstan 11, the tubes 12, 13 and 14—14, and the nozzles 16—16 are all mounted on a main supporting frame 19. The belt-type capstan 11 is conventional, and includes a rotary capstan wheel 21 journalled on the frame 19 and a suitable drive motor (not shown) for rotating the capstan wheel 21 in a counterclockwise direction, as viewed in Fig. 1. The capstan 11 also includes a taut, endless belt 22 passing tightly around a portion of the periphery of the capstan wheel 21 and also passing around each of three sheaves 23—23, which are freely rotatable and are journalled on the frame 19. The sheaves 23—23 serve to tension the belt 22 and to determine the entrance and exit angles of the wire 10, which passes between the wheel 21 and the belt 22 for advancement as the wheel 21 is rotated. A guide pulley 24 is also mounted rotatably on the frame 19 to direct the wire 10 into the nip between the wheel 21 and the belt 22.

The collecting tube 12 is secured by a bracket member 26 to the frame 19 and is positioned as close as possible to the point of discharge of the wire 10 from the capstan wheel 21. The tube 12 collects the wire 10 issuing from the capstan wheel 21 and directs the same vertically downward into the entrance end 27 of the distributing tube 13.

The distributing tube 13 is formed with a pair of mounting pins 28—28 projecting on either side thereof near the entrance end 27, and the pins 28—28 are rotatably supported in a U-shaped mounting bracket 29, which in turn is secured to the frame 19. The bracket 29 supports the distributing tube 13 so that it may be pivoted freely on the pins 28—28, which define a pivot point "P," between each of two operating positions illustrated respectively in Figs. 1 and 2. The first operating position aligns the distributing tube 13 with the left guide tube 14, as seen in Fig. 1, while in the second operating position the distributing tube 13 is aligned with the right guide tube 14.

As illustrated in Fig. 2, the clearance between the collecting tube 12 and the entrance end 27 of the distributing tube 13 is made sufficiently large to accommodate the limited pivoting movement. The distributing tube 13 is moved between the two operating positions by means of an air cylinder 31 secured to the frame 19 and having a piston rod 32 connected to a bracket 33, which is also secured to the distributing tube 13 near the center thereof.

The guide tubes 14—14 are secured to the frame 19 by means of a number of supporting brackets 34—34 so that their entrance ends 36—36 lie in close proximity to each other, preferably in abutting relationship, as illustrated in Fig. 2. The guide tubes 14—14 are also mounted so that their entrance ends 36—36 are in the closest possible proximity to the lower or exit end 37 of the distributing tube 13 permitting the necessary swinging movement of the distributing tube 13 without undue binding or friction.

For this purpose, the exit end 37 of the distributing tube 13 is curved according to an arc of a circle having the pivot point P as a center and the distance from the pivot point as a radius. Correspondingly, the entrance ends 36—36 of both of the guide tubes 14—14 are curved according to an arc of a slightly larger, concentric circle having the pivot point P as a center and the distance from the pivoting point as a radius. With this construction, best shown in Fig. 2, only a very slight clearance exists between the exit end 37 of the distributing tube 13 and the entrance ends 36—36 of the guide tubes 14—14 and, in fact, it is preferable that a slight rubbing should occur. The stroke of the piston rod 32 is limited to positions where the distributing tube 13 aligns or registers precisely with one or the other of the guide tubes 14—14 to deliver the wire 10 therethrough.

As illustrated in Fig. 1, the guide tubes 14—14 diverge outwardly with respect to each other and register near their lower ends with the upper ends of the nozzles 16—16. The nozzles 16—16 are keyed for rotation with a pair of pulleys 38—38, which are rotatably journalled in brackets 39—39 extending from the frame 19. The pulleys 38—38 are driven through a pair of belts 41—41 by suitable drive motors (not shown) to enable rotation of the nozzles 16—16. The axes of rotation of the nozzles 16—16 are in line with the central axes of the barrels 17—17, so that the wire 10 is distributed by the operating nozzle 16 (at the left in Fig. 1) in the form of a continuous coil which falls in the annular area between the outer surface of the barrel 17 and the central core 18. The rotational speed of the nozzles may be synchronized with the wire speed to distribute the wire 10 in coils having varying radii, according to various desired patterns of operation.

The wire 10 is coiled in the barrel 17 at the left of Fig. 1 until that barrel is either filled or unitl any desired length of the wire 10 has been coiled therein. At this time, the air cylinder 31 is actuated to pivot the distributing tube 13 from its position in registry with the left guide tube 14 to its alternative position in registry with the right guide tube 14. The air cylinder 31 may be operated either by a manually operated switch when inspection reveals that one of the barrels 17—17 has been filled to a desired depth, or automatically by a conventional footage counter (not shown), which counts the feet of wire coiled and actuates the air cylinder 31 to change the line of distribution when a predetermined amount of the wire has been collected.

Referring now to Fig. 2, as the distributing tube 13 switches from the right position illustrated in solid lines to the left position illustrated in phantom lines, the lower right edge 42 of the distributing tube 13 co-operates with the upper left edge 43 of the right guide tube 14 to sever the advancing wire 10. This severing of the wire 10 allows distribution of a freshly cut length of the wire into the left guide tube 14 and into the left barrel 17, Conversely, when the cut-over movement is from left to right, the lower left edge 44 of the distributing tube 13 co-operates with the upper right edge 46 of the left guide tube 14 to sever the wire 10. For these purposes, the cutting edges 42, 43, 44 and 46 are sharpened or honed and the tubes 13 and 14—14 are made of a suitable cutting material such as hardened steel.

It will be obvious that other forms of movable distributing tube might be provided which are registerable with any one of a number of wire-guide tubes, with the adjacent ends of the distributing tube and guide tubes being formed with co-operating edges designed to sever the wire.

It will further be obvious that various other modifications may be made from the specific details described in connection with the above exemplary embodiment of the invention, without departing from the spirit and scope of the invention.

What is claimed is:

1. In apparatus of the type wherein an advancing strand is to be delivered alternately through a number of guide members, a cut-over mechanism which comprises a plurality of guide members, a movable distributing guide designed to deliver the advancing strand to the guide members, means for moving said distributing guide between positions where said distributing guide registers with different ones of the guide members, and co-operating means provided on the guide members and the distributing guide for severing the advancing strand as the distributing guide moves from one distributing position to another.

2. In apparatus of the type wherein an advancing strand is to be delivered alternately through a number of guide tubes, a cut-over mechanism which comprises a plurality of guide tubes, a distributing tube arranged to deliver the advancing strand to an aligned one of the guide tubes, means for causing relative cut-over movement between said distributing tube and the guide tubes to cause alignment between said distributing tube and a different one of the guide tubes, and means provided on said distributing tube and the guide tubes for severing the advancing strand during the cut-over movement.

3. In apparatus of the type wherein an advancing strand is to be delivered alternately through a number of guide tubes, a cut-over mechanism which comprises a plurality of guide tubes, a movable distributing tube arranged to deliver the advancing strand to the guide tubes, means for moving said distributing tube between positions where said distributing tube registers with different ones of the guide tubes, and means provided on said distributing tube and the guide tubes which co-operate to sever the advancing strand as said distributing tube moves from one distributing position to another.

4. In strand-collection apparatus of the type wherein an advancing strand is to be delivered alternately through a number of guide tubes to a corresponding number of take-up units, a cut-over mechanism which comprises a plurality of guide tubes, a movable distributing tube initially positioned in alignment with a first one of the guide tubes so that the strand advances through said distributing tube into the first guide tube, and means for moving said distributing tube to a position where said distributing tube aligns with a second one of the guide tubes to pass the strand into that guide tube, the adjacent ends of said distributing tube and the first guide tube being formed with co-operating edges designed to sever the advancing strand as said distributing tube is moved from the first guide tube to the second guide tube.

5. In strand-collection apparatus of the type wherein an advancing strand is to be delivered alternately to a pair of take-up units, a cut-over mechanism which comprises a pair of guide tubes associated one with each of the take-up units and designed for directing the advancing strand out the exit ends thereof to the take-up units, the entrance ends of said guide tubes being disposed in substantially abutting relationship to each other, a distributing tube having an entrance end into which the strand advances and an exit end from which the strand is delivered into the entrance end of one of said guide tubes, means for mounting said distributing tube for pivoting movement about a pivot point located near the entrance end thereof and at such a distance from said guide tubes that the exit end of said distributing tube may swing in close proximity to the entrance ends of said guide tubes, the exit end of said distributing tube and the entrance ends of said guide tubes being curved according to arcs of concentric circles having the pivot point of said distributing tube as a center and the distance from the pivoting point as a radius, and means for pivoting said distributing tube between limiting positions where said distributing tube aligns first with one and then with the other guide tube to pass the strand alternately into one guide tube and then the other, portions of the closely adjacent ends of said distributing tube and said guide tubes co-operating to sever the advancing strand as said distributing tube is moved from one distributing position to the other.

6. Apparatus for distributing an advancing strand alternately into containers positioned at a pair of locations, which comprises a pair of rotating nozzles associated one with each container location for delivering the strand into the containers for collection therein in coil form, a pair of stationary guide tubes associated one with each nozzle for delivering the advancing strand thereto, a pivotably mounted distributing tube registerable with both of said guide tubes for delivering the advancing strand to said guide tubes, and means for pivoting said guide tube from a registering position with a first guide tube to a registering position with the second guide tube, adjacent edges of said distributing tube and the first guide tube passing in close proximity to each other and being sharpened to sever the advancing strand as said distributing tube passes out of registry with the first guide tube and into registry with the second guide tube.

References Cited in the file of this patent

UNITED STATES PATENTS

| | | |
|---|---|---|
| 2,019,128 | Furst | Oct. 29, 1935 |
| 2,126,528 | Beach | Aug. 9, 1938 |
| 2,644,645 | Bevevino | July 7, 1953 |